(12) United States Patent
Willimczik

(10) Patent No.: US 10,132,299 B2
(45) Date of Patent: Nov. 20, 2018

(54) ULTRA DEEP HYDROELECTRIC/GEOTHERMAL POWER PLANT

(71) Applicant: Wolfhart Hans Willimczik, Bradenton, FL (US)

(72) Inventor: Wolfhart Hans Willimczik, Bradenton, FL (US)

( * ) Notice: Subject to any disclaimer, the term of this patent is extended or adjusted under 35 U.S.C. 154(b) by 169 days.

(21) Appl. No.: 15/290,995

(22) Filed: Oct. 11, 2016

(65) Prior Publication Data

US 2018/0100491 A1    Apr. 12, 2018

(51) Int. Cl.
| | | |
|---|---|---|
| *F24T 10/10* | (2018.01) | |
| *F03G 7/04* | (2006.01) | |
| *F03B 13/00* | (2006.01) | |
| *F01K 7/16* | (2006.01) | |

(52) U.S. Cl.
CPC ........... *F03G 7/04* (2013.01); *F03B 13/00* (2013.01); *F24T 10/10* (2018.05); *F01K 7/16* (2013.01); *F05B 2220/32* (2013.01); *Y02E 10/10* (2013.01)

(58) Field of Classification Search
CPC .......... F03G 7/04; F03B 17/061; F03B 13/10; F01K 7/16; F05B 2220/32; Y02E 10/12; Y02E 10/125; Y02E 10/10
See application file for complete search history.

(56) References Cited

U.S. PATENT DOCUMENTS

| | | | | |
|---|---|---|---|---|
| 6,862,886 B2* | 3/2005 | Stewart | ............... | F03G 7/04 |
| | | | | 60/641.2 |
| 7,059,131 B2* | 6/2006 | Hildebrand | ............ | F24T 10/17 |
| | | | | 60/641.2 |
| 7,621,129 B2* | 11/2009 | DuBois | .................. | F03G 6/045 |
| | | | | 60/641.2 |
| 8,875,511 B2* | 11/2014 | Simpson | .................. | F03D 3/00 |
| | | | | 60/641.2 |
| 9,709,337 B2* | 7/2017 | Pilebro | ............... | F28D 20/0052 |
| 2008/0223041 A1* | 9/2008 | Reynolds | ................. | F03G 7/04 |
| | | | | 60/641.5 |
| 2010/0052326 A1* | 3/2010 | Jonsson | ................... | F03G 7/04 |
| | | | | 290/52 |
| 2011/0247328 A1* | 10/2011 | DuBois | .................. | F03G 6/045 |
| | | | | 60/641.3 |
| 2018/0224164 A1* | 8/2018 | Lakic | ..................... | F24T 50/00 |

* cited by examiner

*Primary Examiner* — Michael C Zarroli

(57) ABSTRACT

This invention consists mainly of a long sloped tunnel, a deep hydroelectric/geothermal power plant and hot rocks transforming water into steam. Advanced tunnelling machines are able to reach lengths and depths never possible before with the old drilling method.
The drop height of the water for the hydroelectric power plan is for instance over 10 km and the gained water pressure over 1000 bar feeding special high pressure water turbines or big hydraulic water motors driving again generators. After passing the water turbines the water is pressed with a rest pressure of about 250 bar into hot rocks generating high pressure overheated steam for steam turbines in a range of gig watts. Then the steam rises up in the sloped tunnel as in a chimney, cools down, condensate to water and starts the entire process again.

1 Claim, 1 Drawing Sheet

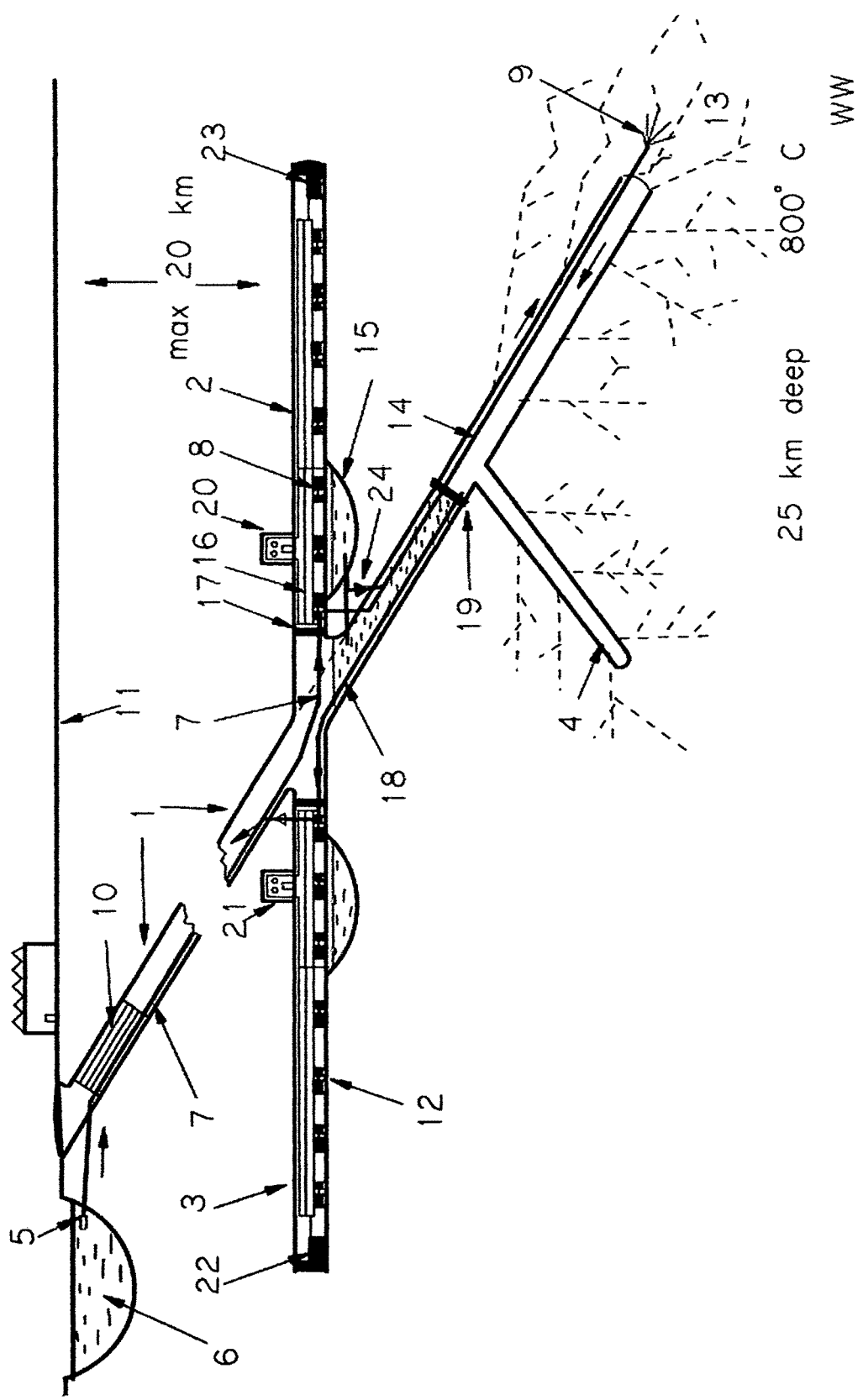

ULTRA DEEP HYDROELECTRIC/GEOTHERMAL POWER PLANT

BACKGROUND OF THIS INVENTION

Today's power plants utilizing geothermal heat are placed on the surface of the earth and utilize 2 small holes for water downwards and steam upwards, but they reached never 20 km deepness. The drilling of small holes has big disadvantages; the drill head must be attached to the drilling rig on the surface and the torque must be transmitted over a very long distance.

The bore head can only be repaired by taking it out all the way. There are also not yet shaft drilling machines for vertical drilling to 10-20 km.

The temperatures are not high enough everywhere for a good efficiency of the carnot process. The temperature rises about 33° C. every kilometer down, somewhere even less. The greater temperature and pressure the greater is the power and efficiency of the turbines. Ergo we have to go deeper in the earth.

Furthermore the turbines on the surface of the earth can't utilize the energy of the water falling in great depths.

SUMMARY OF THIS INVENTION

All these disadvantages will be removed by this invention.

To reach greater depths advanced tunnel drilling machines are utilized like the ones for the Gotthard tunnel with a length of more than 50 km. They are already able to make tunnels of any given length and are already able to work at an angle of 30° downwards. The same tunnel with the slope of 30° will do—even with a smaller diameter as long the big steam turbines fit in. The new deep drilling technology is practical already there, only never used to go deep in the earth. The 30° slope is not necessary for the function of the deep power plant, but it is convenient to drive down on a robust rack railway providing transportation to and from the power plant. 2 parallel tunnels would be even better.

Instead of drilling only small vertical holes a long sloped tunnel is drilled. It will be stopped until the temperature is great enough to transform water into steam of 500° C. or if the tunnel machine will melt down. Then in a higher and cooler region, just tolerable for humans, a horizontal tunnel is drilled and high pressure water turbines, steam turbines with generators are installed. The sloped tunnel goes further in deeper, very hot regions, possible with a smaller diameter. The tunnelling machine must work remote controlled without any humans present. It will be driven by water hydraulic motors (Wolfhart principle). The pressure water is free in such depths. Everything is heavenly water cooled. This machine could even work under water. The machine may run until it will melt down and remains on the ground of the tunnel.

The hot region will be utilized to transform any water into steam, which is collected in the lower part of the tunnel hold down by a strong cover supported by an adjustable water column over the cover. About 2 km water column will balance 200 bar steam pressure. The over heated high pressure steam goes though a pipe to the steam turbine in a giga watt range. After passing the turbines the steam rises upwards in a big chimney or sloped tunnel respectively a long way where it cools down and condenses again to water. The long tunnel has its own weather system with a "troposphere". The "rain" will be collected mostly close the outlet to the surface of the earth and flows downwards in a long pipe, wherein the pressure gradually rises. For instance at 10 km deepness there are 1000 bar pressure. This is more than enough pressure for injection in the hot rocks and to drive high pressure turbines driving again generators. It is a water hydroelectric power plant with a drop height of the water of about 10 km, what is never achievable on the surface of the earth, only the volume of the water is limited. Together this hydroelectric/geothermal power plant is even more powerful than nuclear power plans. In principle it is also nuclear energy, but made in the core of the earth—ergo not harmful for humans. It needs nothing from the surface of the earth, except water to start the process. It is a circulation of water/steam between hot rocks and colder regions of the earth. The deeper it is, the greater the difference in temperature, the better is the efficiency. The steam can be let out or the tunnel can be covered that only a big electrical cable and perhaps a water pipe for the condenser comes out. If all steam condenses to water no new water is needed for the turbines. Depending of the collecting high the water pressure will be different. The best scenario is to condense all steam short under the surface with help of a pipe coil heat exchanger. This would generate the highest pressure for the water turbines. In deeper levels condense water will also be collected. Every collecting inlet has it's own pipe and it's own turbine. Even only 2 km over a turbine the incoming water has a pressure of 200 bar, what is already good enough to turn a turbine or feed the rocks.

The outgoing water from the water turbines is mostly guided directly into the hot rocks with a rest pressure of about 200 bar. Several smaller tunnels and fracking may help to get enough steam.

The amount of generated electrical energy depends on the amount of steam generated per second. It depends on the dimensions of the volume of the reachable pores hot rocks, the temperature gradient and the heat conductivity of the rocks itself. The rocks may have an un-cooled temperature of about 800° C. what falls in more manageable temperature on the surface if cooled by water. The hotter the rocks are, the better is the entire process. The deeper the tunnelling machines can go, the better will be the power plant.

In case there is enough water available the entire cooling can be dropped and only fresh water guided to the turbines below. This would be the simplest version of this power plant, but in this case the upcoming steam may contain harmful substances. In this case a primary and a secondary water circulation is advisable, as it is already utilized in nuclear power plants.

In case no steam comes out of the tunnel the harmful substances going back, where they are coming from.

The described water/steam/water circulation is sustainable for a very long time, even during an ice age. The steamy outlet (if open) will melt ice and these new water will further feed the water turbines. This water-steam circulation needs a cold region over a hot one to generate electricity. That's all.

The out of the water turbines coming water can temporarily collected in a cave or like that. An empty water reservoir means electricity can be made temporarily without any steam. The production of steam will cease, but the power plant will continue generating some electricity. This time may be used for repairs etc.

Such a power plant on the surface would be ineffective, because the steam will cool down on the long way up and the water has no potential energy.

This power plant can be build almost in every region of the earth, even in Antarctica. It is only a question of how deep must be drilled.

It will make every country more independent from oil and gas and will help to avoid conflicts. By the way the deep tunnels can have a lot of sensors to read the earth's breathing and eventually forecast earth quakes etc.

One of such deep tunnels could be sacrificed and filled up with radioactive waste. This invention is not made to install deep rocket lunch systems etc for the military, but it could be used for shelters.

BRIEF DESCRIPTION OF THE DRAWING

FIG. 1 is a schematic cross section of the entire creation

DETAILED DESCRIPTION OF THE PREFERRED EMBODIMENTS

Referring to FIG. 1, there is shown a schematic cross section of the entire creation, but the drawing is not true to scale.

There is a 50 km long tunnel 1 like the Gotthard tunnel, but with a slope of 30°. At a maximal deepness of about 20 km—depending on the local temperature—is a power plant with many turbines in horizontal tunnels 2 and 3. Even deeper is a smaller branch 4 of the main tunnel made by remote controlled tunnel machines. The region 13 of the pores hot rocks is un-cooled over 800° C., but will get cooler if pressure water is injected through the pipe 14 and an array of nozzles 9. The hot pressurized steam is collected in the lower portion of the tunnels 1 and 4. A heavy cover 19 separates the hot steam from the rest of the tunnels. Water will fill up a portion of the tunnel over the cover. This helps to lock the cover down against hot steam of about 200 bar pressure. At a thickness of 2 km water would be a balance. There is a pipe connecting both deep sees for spill over. All 3 water bodies have the same level. To lower the water level there is an extra pump 24 to press the water into the hot pressurized region back in the circulation. This pump runs only if needed. The condense water from above has enough pressure to penetrate the hot rocks even with the detour over the water turbines 8.

The power plant can go on generating electricity only with the water in the own deep sees. If the condensation in the long tunnel is complete, no water from above is necessary any more. The process is very simple. Firstly clean water from a river 6 is getting through a screen 5 and runs without any pump through an about 50 km long pipe 7 gaining gravitational pressure of about 2000 bar at a deepness of 20 km feeding the high pressure water turbines 8 or water hydraulic motors (Wolfhart Principle). With a rest pressure of about 250 bar the water is running through the pipe 14 and is injected with nozzles 9 into hot rocks 13 where the water is changed into steam and collected under the cover 19. A pipe 18 feeds the steam turbines 12 with about 170 bar at 580° C.—each generating about 250 MW electricity like the SST900 from Siemens. They are 11 m wide and fit in the tunnels. They drive down on a rack railway very slowly. Good brakes are essential, otherwise the heavy load will run down in the hot rocks and never seen again.

The workers or intranauts respectively must work in the beginning under 2 bar pressure and in a hot environment. They look like astronauts in their cooling suits. They must be brought slowly back to the surface like divers from a 20 m water depth or they stay in the deep "hotels" for days. There are cooled areas with normal pressure in the horizontal tunnels, but there will be a steamy and wet ride back home on the rack trail in cabins. To stop the steam production would mean to shut down the steam turbines. Therefore, a second tunnel could be made or one tunnel will be divided in sections for water, steam and people.

After passing the steam turbines the steam rises up in the tunnel and cools down. At last it will condense in a heat exchange system 10 close under the surface of the earth 11. The condense water will be collected and runs down again a long pipe and feeds first the water turbines again and then it is changed into steam again. In the best-case scenario no water from the river is necessary any more. It is a closed sustainable circulation as in nature. The deep tunnel has it's own weather system. There are no big pumps necessary.

Not 100% of the water can be recaptured under the heat exchanger 10, but in different heights other water collecting stations can be installed. For instance the water from a 10 km height runs down in an extra pipe and enters an extra turbine still running with 1000 bar instead with 2000 bar static pressure.

The air pressure down there is about 2 bar—like in a tire of a car or 20 Meter under Water. Therefore, strong hermetic doors 17 close the horizontal tunnels up. There is only a small tunnel connecting both for the intranauts going around the sloped tunnel. It could be made also only one horizontal tunnel, but 2 are better for redundancy. A comfortable climate is made behind these doors. Temperature and pressure are lowered. The electrical power cables are placed inside the cool water pipes for cooling purposes in the hot regions. All walls are cooled by fresh water in pipes 16 from above. A small see 15 holds fluctuations in temperature down. There is even a kind of hotel "Deep View" 20 for intranauts—contrary to astronauts—with a view of the bright illuminated small see and another "hotel" called "hot rock" 21. It is also a shelter for the workers in an emergency with all live supporting things. It can be extra hermetic closed. For redundancy every important installation is doubled. In time most work is done by robots or remotely.

If the tunnelling machine is driven by water hydraulic motors and everything is totally water-cooled it can drill in hot layers—even under water. The tunnelling machines 22 and 23 remain on the grounds of the tunnels and go further if needed and still running.

The predictions are made after about 100 years experience with this technology. It will work already at much lower deepness, but not that efficient.

The simplest way would be to let the water run down permanently and let the steam come up to the power station on the surface of the earth as it is done in smaller versions without tunnelling. Some heat loss will occur for the steam in the wide long tunnel. For injecting the water in the hot rocks there is no water pump necessary, because the tunnel brings the low air pressure to the rocks below. There is building up a low-pressure zone in the rocks surrounding the tunnel or shaft.

The invention claimed is:

1. Ultra deep geothermal power plant powered by high temperature and high-pressure steam generated by hot rocks in thermal regions of the crust of the earth comprising:
  a) a strait sloped tunnel from the surface of the earth to a hot region of the crust of the earth, the tunnel is made by modern tunneling machines;
  b) a rack railway and water pipes inside the sloped tunnel, the railway for transportation to the subterranean power plant;
  c) the sloped tunnel is divided by having a cover below the power plant and over the hot rocks, the portion of the sloped tunnel below the cover is utilized as a reservoir for the hot and pressurized steam continuously generated by the hot rocks;

d) and the portion of the sloped tunnel above the cover is utilized as a water column with a certain pressure and volume to hold the cover in place by equalizing pressure forces between the steam and water tunnel sections exerting pressure on the cover.

\* \* \* \* \*